Feb. 17, 1942. W. A. TRAUT 2,273,602

MOTION TRANSMITTING MECHANISM

Filed March 21, 1940

INVENTOR
W. A. Traut
BY
Morsell, Lieber & Morsell
ATTORNEYS.

Patented Feb. 17, 1942

2,273,602

UNITED STATES PATENT OFFICE 2,273,602

MOTION TRANSMITTING MECHANISM

William A. Traut, West Allis, Wis., assignor to Blackhawk Mfg. Co., Milwaukee, Wis., a corporation of Wisconsin Application March 21, 1940, Serial No. 325,145

6 Claims. (Cl. 74—380)

This invention relates in general to improvements in mechanism for transmitting motion from one element to another, for diverse purposes.

Generally defined, an object of the invention is to provide new and useful motion transmitting mechanism, especially adapted to convert rotary motion of a swingable element into rotary or reciprocating motion of another element.

More specifically stated, an object of the present invention is to provide an improved motion transmitting assemblage for transmitting rotary motion from one gear to another through an intervening reciprocable circular rack, and wherein one of the gears may be swung about the axis of reciprocation of the rack without interfering with the rotary motion transmission.

These and other objects and advantages will be apparent from the following detailed description.

A clear conception of an embodiment of the invention, and of the mode of constructing and of manipulating a motion transmitting mechanism embodying the improvement, may be had by referring to the drawing accompanying and forming a part of this specification wherein like reference characters designate the same parts in the several views.

Figure 3:
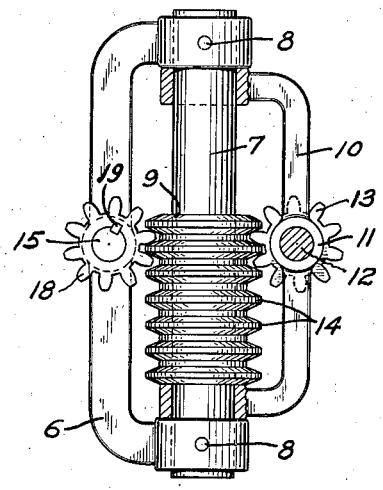
Fig. 3 is a top view similar to that of Fig. 1, but showing the circular rack displaced into one extreme position, and also showing the yoke bearings in section.
Figure 1:
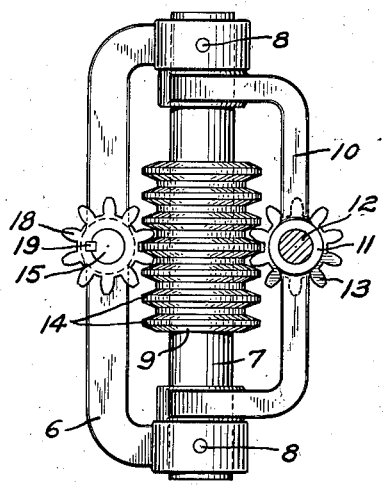
Fig. 1 is a top view of one of the improved motion transmitting assemblages, showing the circular rack in central position and the driving shaft in section.
Figure 4:
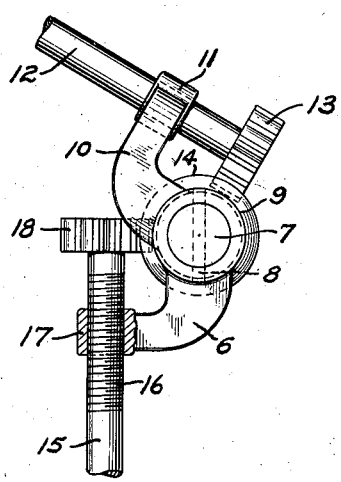
Fig. 4 is a side view similar to that of Fig. 2, but showing the driving shaft and gear and the yoke displaced angularly about the axis of the circular rack.
Figure 2:
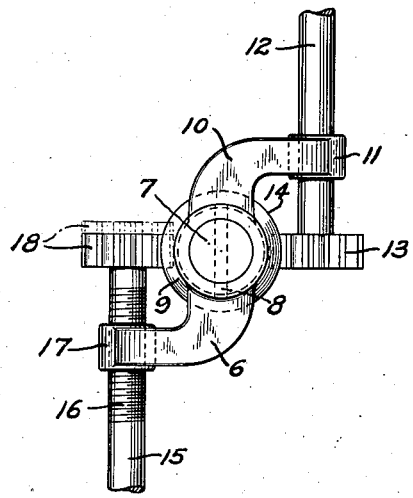
Fig. 2 is a side view of the mechanism positioned as in Fig. 1, and showing the driven gear in dot-and-dash lines displaced in one direction from central position.

While the improved motion transmitting mechanism has been shown as including a circular toothed rack and toothed gears cooperating therewith, it is not the intent to unnecessarily restrict the scope or usefulness of the invention by virtue of such specific embodiment.

Referring to the drawing, the improved motion transmitting mechanism shown therein comprises in general, a main frame 6 having a shaft 7 fixedly mounted therein and secured thereto by pins 8; a motion transmitting member or circular rack 9 slidable along the fixed shaft 7; a yoke 10 swingably suspended from the fixed shaft 7 and having a medial bearing 11; a driving shaft 12 journalled for rotation in the bearing 11 and having a driving element or gear 13 secured thereto and meshing with the annular peripheral teeth 14 of the rack 9; and a driven shaft 15 having screw threads 16 coacting with an internally threaded boss 17 of the frame 6, and also having a driven element or gear 18 secured thereto and meshing with the rack teeth 14 remote from the gear 13.

The gears 13, 18 are of the spur gear type and may be secured to their respective shafts 12, 15 in any suitable manner, as by keys 19. The supporting frame 6 may be of any desired shape and may be part of a larger frame structure, and the ends of the yoke 10 which coact with and are pivotally supported by the shaft 7, should preferably be spaced apart a sufficient distance so that the rack 9 will be able to travel the desired extent. The teeth 14 of the rack member 9 are parallel to each other, and the available travel of the rack 9 should not be sufficient to cause the driven gear to become disengaged from the rack teeth 14 as this gear reciprocates.

During normal use of the improved motion transmitting mechanism, the driving shaft 12 may be rotated in either direction to impart simultaneous rotation to the driving element or gear 13. As the gear 13 is rotated, it coacts with the rack teeth 14 and causes the rack 9 to slide along the fixed shaft 7. This motion of the rack 9 along the fixed shaft 7 will obviously cause the gear 18 to rotate simultaneously with the gear 13 but in an opposite direction. The rotation of the gear 18 is transmitted to the driven shaft 15 and as the shaft 15 rotates, the screw threads 16 thereon will cause the shaft 15 and the gear 18 to move longitudinally of the axis thereof. By virtue of the provision of the yoke 10 which is swingably mounted upon the shaft 7 this yoke 10 together with the driving shaft 12 and gear 13 may be rotated or swung about the central axes of the shaft 7 and of the rack 9, without disturbing the position of the gear 18 by virtue of such swinging movement. The swinging of the yoke 10, however, does not preclude rotation of the shaft 12 and gear 13 during such swinging.

From the foregoing detailed description it will be apparent that my present improvement provides a relatively simple and compact motion transmitting mechanism for transmitting rotary motion from one rotary element to another through an intervening slidable member, and wherein one of the rotary elements may be swung about the axis of the intervening slidable member.

While it is preferable to have the rotary elements and the member provided with intermeshing teeth, this is not absolutely necessary since these parts may have frictional contact only. The driving shaft 12 may obviously receive its propelling motion from any desired source, and the driven shaft 15 may be connected to any device which it is desired to either rotate or reciprocate. The improved mechanism has proven highly satisfactory in actual use, and is adapted for application to various types of structures wherein it is desirable to transfer rotary motion from one gear to another while permitting swinging of one of the gears during such motion transmission.

It should be understood that it is not desired to limit this invention to the exact details of construction or to the precise mode of use, herein shown and described, for various modifications within the scope of the claims may occur to persons skilled in the art.

I claim:

1. In combination, a frame, a shaft fixedly supported on said frame, a member movable along said shaft and having annular parallel peripheral teeth, a driving gear meshing with said member teeth and being swingable about the axis of said shaft, and a driven gear meshing with the teeth of said member and having screw thread coaction with said frame, whereby when said member is moved along said shaft by said driving gear said driving gear is moved along its own axis.

2. In combination, a frame, an elongated cylindrical guide element fixedly secured to said frame, a member supported by and being freely movable along and revolvable about said element, said member having a series of annular parallel peripheral teeth, a driving gear meshing with said member teeth and being swingable about the axis of said element, and a driven gear meshing with said member teeth and having screw thread coaction with said frame, whereby when said member is moved along said element by said driving gear said driven gear is moved along its own axis.

3. In combination, a frame, an elongated cylindrical guide element fixedly mounted on said frame, a circular rack supported by and being freely slidable along and rotatable about said element, and a pair of gears coacting with the teeth of said circular rack, one of said gears being mounted on the frame to swing freely about the longitudinal axis of said rack and the other being provided with means coacting with the frame to render said other gear movable along its own axis during rotation thereof about said axes.

4. In combination, a main frame having spaced ends, an elongated guide shaft secured to said ends and spanning the intervening space, an auxiliary U-shaped frame having spaced end portions swingably suspended from said guide shaft near said main frame ends, a rack member suported by and being freely movable along and revolvable about said shaft between said auxiliary frame end portions, said rack member having a series of parallel annular peripheral teeth, driving and driven shafts journalled in said frames and having axes tangent to a common circle circumscribing said guide shaft, and a spur gear carried by each of said driving and driven shafts and coacting with the same teeth of said series, one of said gears being rotatable to impart rotation to the other through said rack member teeth and the gear and shaft carried by said auxiliary frame being swingable therewith about the central axis of said shaft.

5. In combination, a main frame, a guide shaft carried by said frame, an auxiliary U-shaped frame having spaced ends swingably suspended from said shaft, a circular rack supported by and being freely slidable along said guide shaft between said auxiliary frame ends, a driving shaft journalled in and swingable with said auxiliary frame, a driven shaft rotatable in said main frame, said driving and driven shafts having axes tangent to a common circle disposed concentric with said guide shaft, and a spur gear carried by each of said driving and driven shafts and coacting with the same teeth of said rack.

6. In combination, a main frame, a guide shaft carried by said frame, an auxiliary frame swingably suspended from said shaft, a circular rack supported by and being freely slidable along said guide shaft laterally adjacent to said auxiliary frame, a driving shaft journalled in and swingable with said auxiliary frame, a driven shaft rotatable in said main frame, said driving and driven shafts having axes tangent to a common circle disposed concentric with said guide shaft, and similar spur gears carried by said driving and driven shafts and coacting with the same teeth of said rack.

WILLIAM A. TRAUT.